United States Patent
Miyatake et al.

(10) Patent No.: US 11,476,503 B2
(45) Date of Patent: Oct. 18, 2022

(54) ALL-SOLID-STATE BATTERY

(71) Applicant: Panasonic Intellectual Property Management Co., Ltd., Osaka (JP)

(72) Inventors: Kazufumi Miyatake, Osaka (JP); Motohiro Okochi, Osaka (JP); Akihiro Horikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 393 days.

(21) Appl. No.: 16/701,198

(22) Filed: Dec. 3, 2019

(65) Prior Publication Data

US 2020/0194840 A1 Jun. 18, 2020

(30) Foreign Application Priority Data

Dec. 12, 2018 (JP) .............................. JP2018-232708

(51) Int. Cl.
*H01M 10/0585* (2010.01)
*H01M 10/0525* (2010.01)

(52) U.S. Cl.
CPC ... *H01M 10/0585* (2013.01); *H01M 10/0525* (2013.01); *H01M 2300/0068* (2013.01)

(58) Field of Classification Search
CPC ......... H01M 10/0585; H01M 10/0525; H01M 2300/0068
See application file for complete search history.

(56) References Cited

U.S. PATENT DOCUMENTS

| | | | |
|---|---|---|---|
| 9,853,274 B2 | 12/2017 | Tanaka | |
| 2005/0175901 A1* | 8/2005 | Kawakami | H01M 4/134 429/231.95 |
| 2013/0323568 A1 | 12/2013 | Tanaka | |
| 2016/0181650 A1 | 6/2016 | Ide | |
| 2017/0179519 A1 | 6/2017 | Okamoto et al. | |
| 2017/0263981 A1 | 9/2017 | Satou | |

(Continued)

FOREIGN PATENT DOCUMENTS

| | | |
|---|---|---|
| EP | 3 316 382 | 5/2018 |
| JP | 10-92418 | 4/1998 |

(Continued)

OTHER PUBLICATIONS

Extended European Search Report dated May 4, 2020 in corresponding European Patent Application No. 19214900.3.

*Primary Examiner* — Osei K Amponsah
(74) *Attorney, Agent, or Firm* — Wenderoth, Lind & Ponack, L.L.P.

(57) ABSTRACT

An all-solid-state battery includes: a positive electrode layer including a positive electrode current collector and a positive electrode mixture layer; a negative electrode layer including a negative electrode current collector and a negative electrode mixture layer; and a solid electrolyte layer. The solid electrolyte layer is disposed between the positive electrode mixture layer and the negative electrode mixture layer. A weight per unit area of a first portion of the negative electrode mixture layer overlapping the positive electrode mixture layer on a stacking axis is greater than a weight per unit area of a second portion of the negative electrode mixture layer not overlapping the positive electrode mixture layer on the stacking axis.

8 Claims, 3 Drawing Sheets

(56) References Cited

U.S. PATENT DOCUMENTS

| | | | |
|---|---|---|---|
| 2017/0373299 A1 | 12/2017 | Takeda et al. | |
| 2018/0198169 A1* | 7/2018 | Fukui | H01M 4/64 |
| 2018/0226652 A1 | 8/2018 | Mori et al. | |
| 2020/0076002 A1 | 3/2020 | Okamoto et al. | |

FOREIGN PATENT DOCUMENTS

| | | |
|---|---|---|
| JP | 2001-15146 | 1/2001 |
| JP | 2014-11066 | 1/2014 |
| JP | 2017-168429 | 9/2017 |
| JP | 6217286 B | 10/2017 |
| JP | 2018-129222 | 8/2018 |
| WO | 2012/114497 | 8/2012 |
| WO | 2015/015663 | 2/2015 |
| WO | 2015/147122 | 10/2015 |
| WO | 2016/121734 | 8/2016 |
| WO | 2018/110688 | 6/2018 |

\* cited by examiner

FIG. 1 - PRIOR ART
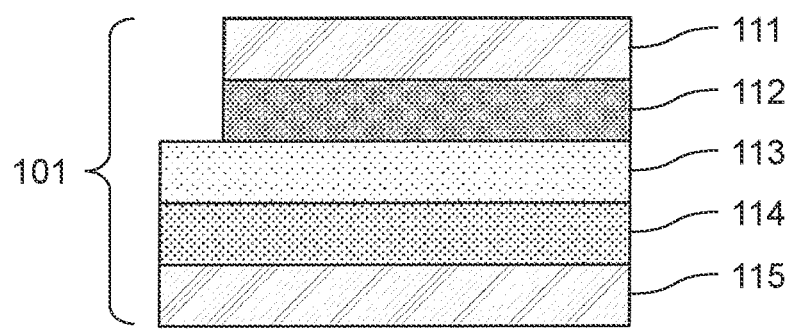
FIG. 2 - PRIOR ART
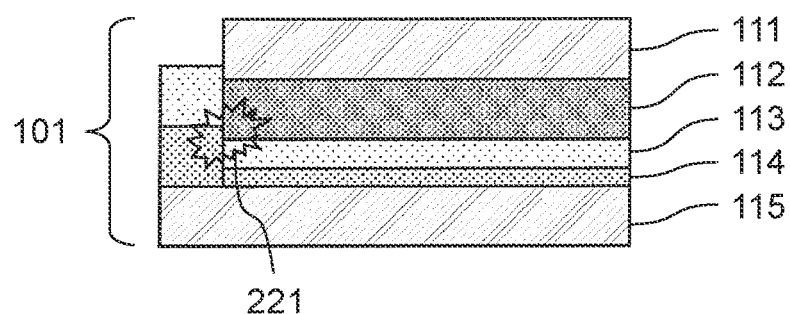
FIG. 3
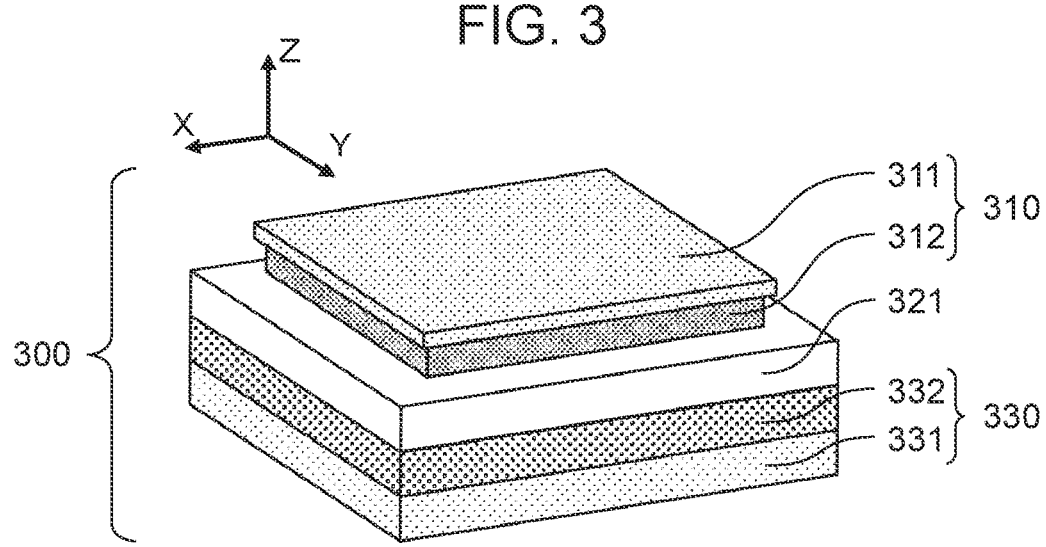

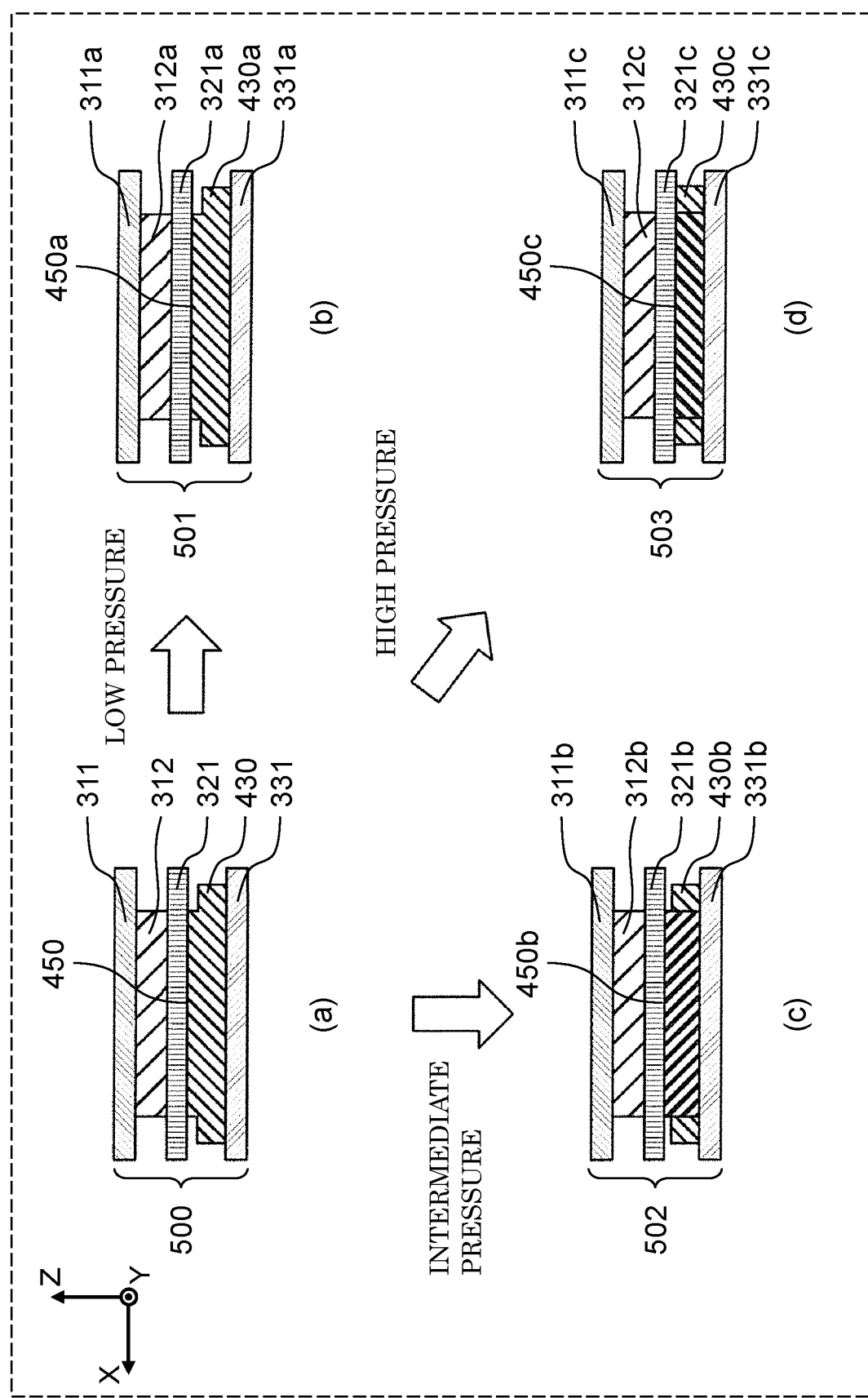

ALL-SOLID-STATE BATTERY

BACKGROUND

1. Technical Field

The present disclosure relates to an all-solid-state battery including a positive electrode layer, a negative electrode layer, and a solid electrolyte layer.

2. Description of the Related Art

Recently, development of a secondary battery that can be repeatedly used has been required along with a reduction in weight of an electronic apparatus such as a personal computer or a cellular phone and manufacturing of cordless electronic apparatuses. Examples of the secondary battery include a nickel-cadmium battery, a nickel-metal hydride battery, a lead storage battery, and a lithium ion battery. In particular, the lithium ion battery has characteristics such as a light weight, high voltage, and high energy density, and thus has attracted attention.

The lithium ion battery includes a positive electrode layer, and a negative electrode layer, and an electrolyte that is disposed between the positive electrode layer and the negative electrode layer. As the electrolyte, for example, an electrolytic solution or a solid electrolyte in which a supporting electrolyte such as lithium hexafluorophosphate is dissolved in an organic solvent is used. A lithium ion battery that is currently widely used has combustibility because an electrolytic solution including an organic solvent is used therein. Therefore, a material, a structure, and a system for securing safety of the lithium ion battery are required. On the other hand, by using an incombustible solid electrolyte as the electrolyte, simplification of the material, the structure, and the system can be expected, and it is considered that an increase in energy density, a reduction in manufacturing costs, and improvement of productivity can be achieved. Hereinafter, the lithium ion battery using the solid electrolyte will be referred to as "all-solid-state battery".

The solid electrolyte can be roughly divided into an organic solid electrolyte and an inorganic solid electrolyte. The organic solid electrolyte has an ion conductivity of about $10^{-6}$ S/cm at 25° C., which is much lower than $10^{-3}$ S/cm as an ion conductivity of an electrolytic solution. Therefore, it is difficult to operate the all-solid-state battery using the organic solid electrolyte in an environment at 25° C. Examples of the inorganic solid electrolyte include an oxide solid electrolyte and a sulfide solid electrolyte. The ion conductivities of these inorganic solid electrolytes are about $10^{-4}$ to $10^{-3}$ S/cm and are relatively high. The oxide solid electrolyte has a high grain boundary resistivity. Therefore, as means for reducing the grain boundary resistivity, sintering of powder and thinning are considered. In the case of sintering, a constituent element of a positive electrode or a negative electrode and a constituent element of a solid electrolyte are diffused to each other due to a treatment at a high temperature, and thus it is difficult to obtain sufficient characteristics. Therefore, in the all-solid-state battery using the oxide solid electrolyte, thinning is mainly considered. On the other hand, since the sulfide solid electrolyte has a lower grain boundary resistivity than the oxide solid electrolyte, excellent characteristics can be obtained with only compression molding of powder. Therefore, recently, the sulfide solid electrolyte has been actively studied.

In the all-solid-state battery, in order to improve reliability of the battery, it is necessary to prevent contact between a positive electrode mixture layer and a negative electrode mixture layer. FIG. 1 is an enlarged cross-sectional view illustrating an end portion of all-solid-state battery 101 described in Japanese Patent No. 6217286. As illustrated in FIG. 1, the position of an end portion of positive electrode mixture layer 112 and the position of an end portion of negative electrode mixture layer 114 are shifted from each other to suppress contact between positive electrode mixture layer 112 and negative electrode mixture layer 114.

SUMMARY

An all-solid-state battery includes a positive electrode layer, a negative electrode layer, and a solid electrolyte layer. The positive electrode layer includes a positive electrode current collector and a positive electrode mixture layer. The positive electrode mixture layer includes a positive electrode active material and a solid electrolyte and is stacked on the positive electrode current collector. The negative electrode layer includes a negative electrode current collector and a negative electrode mixture layer. The negative electrode mixture layer includes a negative electrode active material and a solid electrolyte and is stacked on the negative electrode current collector. The solid electrolyte layer is disposed between the positive electrode mixture layer and the negative electrode mixture layer and includes a solid electrolyte having ion conductivity. A weight per unit area of a first portion of the negative electrode mixture layer overlapping the positive electrode mixture layer on a stacking axis is greater than a weight per unit area of a second portion of the negative electrode mixture layer not overlapping the positive electrode mixture layer on the stacking axis.

BRIEF DESCRIPTION OF THE DRAWINGS

FIG. 1 is a cross-sectional view illustrating an end portion of an all-solid-state battery of the related art;

FIG. 2 is a cross-sectional view illustrating an end portion of the pressed all-solid-state battery of the related art;

FIG. 3 is a perspective view illustrating an all-solid-state battery according to an embodiment;

FIG. 5 is cross-sectional views illustrating states before and after pressing the all-solid-state batteries according to the embodiment.

DETAILED DESCRIPTION

Figure 4:
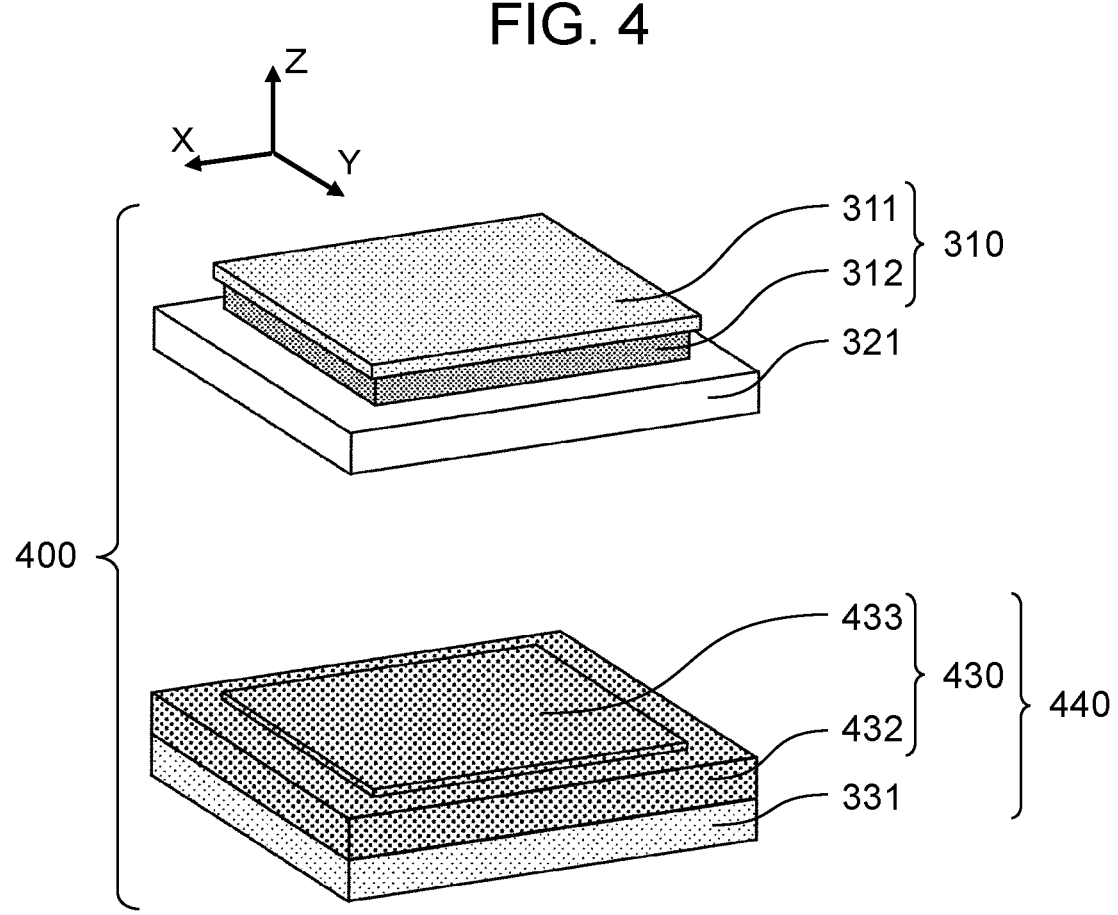
FIG. 4 is a perspective view illustrating a step structure of a negative electrode mixture layer included in the all-solid-state battery according to the embodiment.

In a configuration of the related art, a positive electrode mixture layer and a negative electrode mixture layer may come into contact with each other in the process of manufacturing an all-solid-state battery. FIG. 2 illustrates an example of this configuration.

In the process of manufacturing the all-solid-state battery, positive electrode mixture layer 112, negative electrode mixture layer 114, and solid electrolyte layer 113 are pressed in a stacked state in order to improve the densities of positive electrode mixture layer 112 and negative electrode mixture layer 114 and to improve adhesion of positive electrode mixture layer 112, negative electrode mixture layer 114, and solid electrolyte layer 113.

At this time, a thickness of either positive electrode mixture layer 112 or negative electrode mixture layer 114 where the thickness is more likely to be pressed (in FIG. 2, for example, negative electrode mixture layer 114 is pressed)

decreases such that positive electrode mixture layer 112 and negative electrode mixture layer 114 may come into contact with each other at a position of contact portion 221.

The present disclosure provides an all-solid-state battery capable of reducing the possibility of contact between a positive electrode mixture layer and a negative electrode mixture layer. An all-solid-state battery according to one aspect of the present disclosure includes: a positive electrode layer including a positive electrode current collector and a positive electrode mixture layer, the positive electrode mixture layer being stacked on the positive electrode current collector and including a positive electrode active material and a solid electrolyte; a negative electrode layer including a negative electrode current collector and a negative electrode mixture layer, the negative electrode mixture layer being stacked on the negative electrode current collector and including a negative electrode active material and a solid electrolyte; and a solid electrolyte layer that is disposed between the positive electrode mixture layer and the negative electrode mixture layer and includes a solid electrolyte having ion conductivity, in which a weight per unit area of a first portion of the negative electrode mixture layer overlapping the positive electrode mixture layer on a stacking axis is greater than a weight per unit area of a second portion of the negative electrode mixture layer not overlapping the positive electrode mixture layer on the stacking axis.

As a result, when the all-solid-state battery is pressed from both sides in the stacking direction, such that a pressure is applied to the all-solid-state battery in the stacking direction, portions of the negative electrode mixture layer and the positive electrode mixture layer overlapping each other on the stacking axis may be pressed against each other. However, the weight per unit area of the first portion of the negative electrode mixture layer overlapping the positive electrode mixture layer on the stacking axis is greater than the weight per unit area of the second portion of the negative electrode mixture layer not overlapping the positive electrode mixture layer on the stacking axis. Therefore, an approach between the negative electrode mixture layer and the positive electrode mixture layer is relaxed or suppressed. Accordingly, the possibility of contact between the positive electrode mixture layer and the negative electrode mixture layer that causes a decrease in the reliability of the all-solid-state battery can be reduced. In addition, the weight per unit area on the stacking axis increases such that the capacity of the negative electrode mixture layer increases. Therefore, metal ions included in the positive electrode mixture layer are not likely to be deposited on the negative electrode mixture layer, and the reliability of the all-solid-state battery is improved.

In addition, for example, in the all-solid-state battery, a thickness of the first portion of the negative electrode mixture layer overlapping the positive electrode mixture layer on the stacking axis may be greater than a thickness of the second portion of the negative electrode mixture layer not overlapping the positive electrode mixture layer on the stacking axis.

With this configuration, in a case where a pressure is applied to the all-solid-state battery in the stacking direction, even when the shape of the negative electrode mixture layer is changed, an approach between the positive electrode mixture layer and the negative electrode mixture layer caused by deformation of the first portion of the negative electrode mixture layer overlapping the positive electrode mixture layer can be relaxed. Accordingly, the possibility of contact between the positive electrode mixture layer and the negative electrode mixture layer can be reduced. In addition, the thickness increases such that the capacity of the negative electrode mixture layer increases. Therefore, metal ions included in the positive electrode mixture layer are not likely to be deposited on the negative electrode mixture layer. As a result, the reliability of the all-solid-state battery is improved.

In addition, for example, in the all-solid-state battery, a maximum difference between the thickness of the first portion of the negative electrode mixture layer overlapping the positive electrode mixture layer on the stacking axis and the thickness of the second portion of the negative electrode mixture layer not overlapping the positive electrode mixture layer on the stacking axis is 30% or lower of a minimum thickness of the second portion of the negative electrode mixture layer not overlapping the positive electrode mixture layer on the stacking axis.

That is, the thickness of the first portion of the negative electrode mixture layer overlapping the positive electrode mixture layer on the stacking axis is greater than the thickness of the second portion of the negative electrode mixture layer not overlapping the positive electrode mixture layer on the stacking axis. As a result, in a case where a pressure is applied to the all-solid-state battery in the stacking direction, even when the shape of the negative electrode mixture layer is changed, an approach between the positive electrode mixture layer and the negative electrode mixture layer caused by deformation of the first portion of the negative electrode mixture layer overlapping the positive electrode mixture layer can be relaxed. Accordingly, the possibility of contact between the positive electrode mixture layer and the negative electrode mixture layer can be reduced. That is, the maximum difference between the thickness of the first portion of the negative electrode mixture layer overlapping the positive electrode mixture layer on the stacking axis and the thickness of the second portion of the negative electrode mixture layer not overlapping the positive electrode mixture layer on the stacking axis is adjusted to be less than or equal to a predetermined value. As a result, formation of a large gap between the second portion of the negative electrode mixture layer not overlapping the positive electrode mixture layer and the positive electrode mixture layer can be prevented. Accordingly, the capacity per unit volume of the all-solid-state battery can increase.

In addition, for example, in the all-solid-state battery, a density of the first portion of the negative electrode mixture layer overlapping the positive electrode mixture layer on the stacking axis may be higher than a density of the second portion of the negative electrode mixture layer not overlapping the positive electrode mixture layer on the stacking axis.

With this configuration, in a case where a pressure is applied to the all-solid-state battery in the stacking direction, deformation of the negative electrode mixture layer can be suppressed. Accordingly, the possibility of contact between the positive electrode mixture layer and the negative electrode mixture layer can be reduced. In addition, the density increases such that the capacity of the negative electrode mixture layer increases. As a result, metal ions included in the positive electrode mixture layer are not likely to be deposited on the negative electrode mixture layer, and the reliability of the all-solid-state battery is improved.

In addition, for example, in the all-solid-state battery, a difference between the density of the first portion of the negative electrode mixture layer overlapping the positive electrode mixture layer on the stacking axis and the density of the second portion of the negative electrode mixture layer not overlapping the positive electrode mixture layer on the stacking axis may be 30% or lower of the density of the second portion of the negative electrode mixture layer not overlapping the positive electrode mixture layer on the stacking axis.

That is, the density of the first portion of the negative electrode mixture layer overlapping the positive electrode mixture layer on the stacking axis is higher than the density of second the portion of the negative electrode mixture layer not overlapping the positive electrode mixture layer on the stacking axis. As a result, in a case where a pressure is applied to the all-solid-state battery in the stacking direction, deformation of the negative electrode mixture layer can be suppressed. Accordingly, the possibility of contact between the positive electrode mixture layer and the negative electrode mixture layer can be reduced. That is, the difference between the density of the first portion of the negative electrode mixture layer overlapping the positive electrode mixture layer on the stacking axis and the density of the second portion of the negative electrode mixture layer not overlapping the positive electrode mixture layer on the stacking axis is adjusted to be lower than or equal to a predetermined value. As a result, the amount of a material of the negative electrode mixture layer used can be reduced. Accordingly, the costs of the all-solid-state battery can be reduced.

In addition, for example, in the all-solid-state battery, the weight per unit area of the first portion of the negative electrode mixture layer overlapping the positive electrode mixture layer on the stacking axis is greater than the weight per unit area of the second portion of the negative electrode mixture layer not overlapping the positive electrode mixture layer on the stacking axis by 5% or higher and 30% or lower.

That is, the weight per unit area of the first portion of the negative electrode mixture layer overlapping the positive electrode mixture layer on the stacking axis is greater than the weight per unit area of the second portion of the negative electrode mixture layer not overlapping the positive electrode mixture layer on the stacking axis. As a result, even when the all-solid-state battery is pressed from both sides in the stacking direction, an approach between the negative electrode mixture layer and the positive electrode mixture layer is relaxed or suppressed. Accordingly, the possibility of contact between the positive electrode mixture layer and the negative electrode mixture layer can be reduced. That is, a ratio of the weight per unit area of the first portion of the negative electrode mixture layer overlapping the positive electrode mixture layer on the stacking axis to the weight per unit area of the second portion of the negative electrode mixture layer not overlapping the positive electrode mixture layer on the stacking axis is adjusted to be within a predetermined range. Therefore, the amount of a material of the negative electrode mixture layer used can be reduced while reducing the possibility of contact between the positive electrode mixture layer and the negative electrode mixture layer. As a result, an all-solid-state battery having a good balance between the reliability and the costs can be obtained.

In addition, for example, in the all-solid-state battery of any one, at least one of the positive electrode mixture layer and the negative electrode mixture layer may include a binder.

As a result, binding properties of a positive electrode active material, a negative electrode active material, and a solid electrolyte included in the positive electrode mixture layer, the negative electrode mixture layer, and the solid electrolyte layer are improved. In addition, binding properties between the positive electrode mixture layer and the positive electrode current collector and binding properties between the negative electrode mixture layer and the negative electrode current collector are also improved. Accordingly, the all-solid-state battery having high reliability in which the respective layers and the materials of the respective layers are not likely to be separated can be obtained.

In addition, for example, in the all-solid-state battery, at least one of the positive electrode mixture layer and the negative electrode mixture layer may include a conductive additive.

As a result, the electron conductivity in the positive electrode mixture layer and the negative electrode mixture layer increases, and an electron conduction path is likely to be secured. Accordingly, the amount of a current that can flow through an electron conduction path increases, and thus charge-discharge characteristics of the all-solid-state battery are improved.

In addition, for example, in the all-solid-state battery, a concentration of a solvent in at least one of the positive electrode mixture layer and the negative electrode mixture layer may be 10 ppm or lower.

As a result, the amount of the solvent not contributing to the battery capacity in the positive electrode mixture layer and the negative electrode mixture layer is small. Accordingly, the capacity of the all-solid-state battery is improved. In addition, the solvent remaining in the positive electrode mixture layer and the negative electrode mixture layer is not likely to be gasified, and bubbles are not likely to be formed. Therefore, the reliability of the all-solid-state battery is improved.

Hereinafter, an all-solid-state battery according to an embodiment of the present disclosure will be described with reference to the drawings. The following embodiment describes a specific example of the present disclosure, and a numerical value, a shape, a material, a component, a disposition position and a connection form of a component, and the like are merely exemplary and are not intended to limit the present disclosure. In addition, among components in the following embodiment, a component that is not described in the independent claim indicating the broadest concept of the present disclosure will be described as an optional component.

In addition, each of the drawings is a schematic diagram in which components are appropriately emphasized or not illustrated or ratios therebetween are adjusted in order to illustrate the present disclosure. A shape, a positional relationship, and a ratio are not necessarily strictly illustrated and may be different from the actual ones. In each of the drawings, substantially the same components are represented by the same reference numerals, and repeated description will not be made or simplified.

In addition, in this specification, a term such as parallel representing a relationship between components, a term such as rectangular representing a shape of a component, and a numerical range are not strictly restricted to those described in this specification and include a substantially equivalent term or range. For example, a difference of several percentages are allowed, and "the same area" represents that the area is within a range of ±5%.

In addition, in this specification, a cross-sectional view illustrates a cross-section obtained by cutting the center of the all-solid-state battery in a stacking direction. Here, the stacking direction refers to a direction in which one member constituting the all-solid-state battery is stacked on another member constituting the all-solid-state battery. In the embodiment, the stacking direction is a positive or negative direction of a Z-axis in FIGS. 3 to 5. FIG. 5 is cross-sectional views illustrating the all-solid-state batteries on an X-Z plane. In addition, an axis (in FIGS. 3 to 5, the Z-axis) along the stacking direction will be referred to as "stacking axis".

In addition, terms "upper" and "lower" in the configuration of the all-solid-state battery do not refer to an upper direction (vertical upper) and a lower direction (vertical lower) in the absolute space recognition, and are used as terms defined by a positional relationship relative to the stacking order in the stack configuration. In addition, the terms "upper" and "lower" are applied not only to a case where two components are disposed with a distance such that another component is present between the two components but also to a case where two components are closely disposed in contact with each other.

In addition, in this specification, "plan view" refers to a view illustrating the all-solid-state battery in the stacking direction of the all-solid-state battery.

In addition, in this specification, "a first portion" is defined as a part of the negative electrode mixture layer where the negative electrode mixture layer overlaps the positive electrode mixture layer. "A second portion" is defined as the other part of the negative electrode mixture layer where the negative electrode mixture layer does not overlap the positive electrode mixture layer.

Embodiment

Hereinafter, an all-solid-state battery according to an embodiment and a positive electrode layer, a negative electrode layer, and a solid electrolyte layer constituting the all-solid-state battery will be described in detail with reference to the drawings.

A. All-Solid-State Battery

The all-solid-state battery according to the embodiment will be described using FIG. 3. FIG. 3 is a schematic perspective view illustrating all-solid-state battery 300 according to the embodiment.

As illustrated in FIG. 3, all-solid-state battery 300 according to the embodiment includes, for example, positive electrode layer 310, negative electrode layer 330, and solid electrolyte layer 321. Positive electrode layer 310 includes: positive electrode current collector 311; and positive electrode mixture layer 312 that is stacked on positive electrode current collector 311 and includes at least a positive electrode active material and a solid electrolyte. Negative electrode layer 330 includes: negative electrode current collector 331; and negative electrode mixture layer 332 that is stacked on negative electrode current collector 331 and includes at least a negative electrode active material and a solid electrolyte. Solid electrolyte layer 321 is disposed between positive electrode mixture layer 312 and negative electrode mixture layer 332 and includes at least a solid electrolyte having ion conductivity.

In FIG. 3, all-solid-state battery 300 has a structure in which positive electrode current collector 311, positive electrode mixture layer 312, solid electrolyte layer 321, negative electrode mixture layer 332, and negative electrode current collector 331 that have rectangular shapes in a plan views (X-Y plane), respectively, are disposed in this order from the top. In a plan view, the area of negative electrode mixture layer 332 is the same as the area of solid electrolyte layer 321 and is greater than the area of positive electrode mixture layer 312.

B. Positive Electrode Layer

Next, positive electrode layer 310 according to the embodiment will be described using FIG. 3.

For example, positive electrode layer 310 according to the embodiment includes: positive electrode current collector 311 that is formed of a metal foil; and positive electrode mixture layer 312 that is stacked on positive electrode current collector 311. In a plan view, the area of positive electrode current collector 311 is greater than the area of positive electrode mixture layer 312.

B-1. Positive Electrode Mixture Layer

Positive electrode mixture layer 312 is a film-shaped layer including a positive electrode active material and a solid electrolyte as a positive electrode mixture. Positive electrode mixture layer 312 optionally further includes a binder and a conductive additive.

B-1-1. Positive Electrode Active Material

Hereinafter, the positive electrode active material according to the embodiment will be described.

The positive electrode active material refers to a material that intercalates or deintercalates metal ions such as lithium (Li) ions in a crystalline structure at a higher potential than that of negative electrode layer 330 to be oxidized or reduced with the intercalation or deintercalation of the metal ions such as lithium ions. The kind of the positive electrode active material is appropriately selected depending on the kind of all-solid-state battery 300, and examples thereof include an oxide active material and a sulfide active material.

As the positive electrode active material according to the embodiment, for example, an oxide active material (lithium-containing transition metal oxide) is used. Examples of the oxide active material include $LiCoO_2$, $LiNiO_2$, $LiMn_2O_4$, $LiCoPO_4$, $LiNiPO_4$, $LiFePO_4$, $LiMnPO_4$, and a compound obtained by substituting transition metal in the above-described compound with one or two heteroelements. As the compound obtained by substituting transition metal in the above-described compound with one or two heteroelements, a well-known material such as $LiNi_{1/3}Co_{1/3}Mn_{1/3}O_2$, $LiNi_{0.8}Co_{0.15}Al_{0.05}O_2$, or $LiNi_{0.5}Mn_{1.5}O_2$ is used. As the positive electrode active material, one compound may be used alone, two or more compounds may be used in combination.

Examples of a shape of the positive electrode active material include a particle shape and a thin film shape. When the positive electrode active material has a particle shape, an average particle size ($D_{50}$) of the positive electrode active material is, for example, preferably in a range of 50 nm or more and 50 μm or less and more preferably in a range of 1 μm or more and 15 μm or less. By adjusting the average particle size of the positive electrode active material to be 50 nm or more, the operability is likely to be improved. On the other hand, by adjusting the average particle size to be 50 μm or less, the flat positive electrode layer is likely to be obtained. Therefore, the above-described range is preferable. "Average particle size" described in this specification is a volume average particle size measured using a laser scattering particle size distribution analyzer.

The content of the positive electrode active material in positive electrode mixture layer 312 is not particularly limited and, for example, is preferably 70 wt % or higher and 100% wt % or less. By adjusting the content of the positive electrode active material in positive electrode mixture layer 312 to be 70 wt % or higher, all-solid-state battery 300 having a sufficient charge-discharge capacity is likely to be obtained. Therefore, the above-described range is preferable.

A surface of the positive electrode active material may be coated with a coating layer. The reason for providing the coating layer is to suppress a reaction between the positive electrode active material (for example, an oxide active material) and the solid electrolyte (for example, a sulfide solid electrolyte). Examples of a material of the coating layer include a Li ion conducting oxide such as $LiNbO_3$, $Li_3PO_4$, or LiPON. The average thickness of the coating layer is, for example, preferably in a range of 1 nm or more and 10 nm or less.

Regarding a ratio between the positive electrode active material and the solid electrolyte included in positive electrode mixture layer 312, when a value obtained by dividing the weight of the positive electrode active material by the weight of the solid electrolyte is set as a weight ratio, the weight ratio is preferably in a range of 1 to 19. The reason why the weight ratio is preferably in the above-described range is that both a lithium ion conduction path and an electron conduction path in positive electrode mixture layer 312 are likely to be secured.

B-1-2. Solid Electrolyte

Hereinafter, the solid electrolyte according to the embodiment will be described.

As described above, positive electrode mixture layer 312 according to the embodiment illustrated in FIG. 3 includes a positive electrode active material and a solid electrolyte. The solid electrolyte may be appropriately selected depending on a conducting ion species (for example, a lithium ion) and, for example, can be roughly classified into a sulfide solid electrolyte and an oxide solid electrolyte.

The kind of the sulfide solid electrolyte in the embodiment is not particularly limited, and examples of the sulfide solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. In particular, from the viewpoint of excellent lithium ion conductivity, it is preferable that the sulfide solid electrolyte includes Li, P, and S. As the sulfide solid electrolyte, one material may be used alone, or two or more kinds may be used in combination. In addition, the sulfide solid electrolyte may be crystalline, amorphous, or a glass ceramic. The expression "$Li_2S$—$P_2S_5$" refer to a sulfide solid electrolyte formed of a raw material composition including $Li_2S$ and $P_2S_5$, and the same can be applied to other expressions.

In the embodiment, one form of the sulfide solid electrolyte is a sulfide glass ceramic including $Li_2S$ and $P_2S_5$. Regarding a ratio between $Li_2S$ and $P_2S_5$, when a value obtained by dividing the moles of $Li_2S$ by the moles of $P_2S_5$ is set as a molar ratio, the molar ratio is preferably in a range of 1 or higher and 4 or lower. The reason why the molar ratio is preferably in the above-described range is that a crystalline structure having high ion conductivity can be obtained while maintaining the lithium concentration that affects battery characteristics.

Examples of a shape of the sulfide solid electrolyte in the embodiment include a particle shape such as a spherical shape or an oval spherical shape and a thin film shape. When the sulfide solid electrolyte material has a particle shape, the average particle size ($D_{50}$) of the sulfide solid electrolyte is not particularly limited and is preferably 10 μm or less from the viewpoint of improving the density in the positive electrode layer.

Next, the oxide solid electrolyte according to the embodiment will be described. The kind of the oxide solid electrolyte is not particularly limited, and examples thereof include LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, and $Li_{1.5}Al_{0.5}Ge_{1.5}(PO_4)_3$. As the oxide solid electrolyte, one material may be used alone, or two or more kinds may be used in combination.

In addition, the kind and the particle size of the solid electrolyte included in positive electrode mixture layer 312, negative electrode mixture layer 332, and solid electrolyte layer 321 may vary depending on the respective layers.

B-1-3. Binder

Hereinafter, the binder according to the embodiment will be described.

The binder included in positive electrode mixture layer 312 functions to bind particles of the positive electrode active material, to bind the positive electrode active material and the solid electrolyte, to bind particles of the solid electrolyte, to bind the positive electrode active material and positive electrode current collector 311, to bind the solid electrolyte and positive electrode current collector 311, to bind the positive electrode active material and solid electrolyte layer 321, and to bind the solid electrolyte and solid electrolyte layer 321.

Although the description is repeated, positive electrode mixture layer 312 may or may not include a binder. When positive electrode mixture layer 312 does not include a binder as an adhesive, for example, a method of using the solid electrolyte as an adhesive instead of a binder may be used.

Specific examples of the binder include a synthetic rubber such as butadiene rubber, isoprene rubber, styrene-butadiene rubber (SBR), a styrene-butadiene-styrene copolymer (SBS), a styrene-ethylene-butadiene-styrene copolymer (SEBS), ethylene-propylene rubber, butyl rubber, chloroprene rubber, acrylonitrile-butadiene rubber, acrylic rubber, silicone rubber, fluororubber, or urethane rubber, polyvinylidene fluoride (PVDF), a polyvinylidene fluoride-hexafluoropropylene copolymer (PVDF-HFP), polyimide, polyamide, polyamideimide, polyvinyl alcohol, and chlorinated polyethylene (CPE).

B-1-4. Conductive Additive

Hereinafter, the conductive additive according to the embodiment will be described.

In all-solid-state battery 300 according to the embodiment, positive electrode mixture layer 312 may include the conductive additive.

By adding the conductive additive to positive electrode mixture layer 312, the electron conductivity in positive electrode mixture layer 312 can be increased. Therefore, an electron conduction path in positive electrode mixture layer 312 can be secured, and the internal resistance of all-solid-state battery 300 can be reduced. As a result, the amount of a current that can flow through an electron conduction path increases, and thus charge-discharge characteristics of the all-solid-state battery are improved.

The conductive additive according to the embodiment is not particularly limited as long as it improves the electron conductivity of positive electrode mixture layer 312, and examples thereof include acetylene black, Ketjen black, carbon black, graphite, carbon fibers, and carbon nanotubes. As the conductive additive, one material may be used alone, or two or more kinds may be used in combination.

B-2. Positive Electrode Current Collector

As positive electrode current collector 311, for example, a foil-shaped body, a plate-shaped body, or a net-shaped body formed of aluminum, gold, platinum, zinc, copper, SUS, nickel, tin, titanium, or an alloy of two or more kinds thereof can be used.

In addition, the thickness and the shape of positive electrode current collector 311 may be appropriately selected depending on the use of all-solid-state battery 300.

C. Negative Electrode Layer

Negative electrode layer 330 according to the embodiment will be described using FIG. 3.

For example, negative electrode layer 330 according to the embodiment includes: negative electrode current collector 331 that is formed of a metal foil; and negative electrode mixture layer 332 that is stacked on negative electrode current collector 331.

C-1. Negative Electrode Mixture Layer

Negative electrode mixture layer 332 is a film-shaped layer including a negative electrode active material and a solid electrolyte as a negative electrode mixture. Negative electrode mixture layer 332 optionally further includes a binder and a conductive additive.

C-1-1. Negative Electrode Active Material

Hereinafter, the negative electrode active material according to the embodiment will be described.

The negative electrode active material refers to a material that intercalates or deintercalates metal ions such as lithium ions in a crystalline structure at a lower potential than that of positive electrode layer 310 to be oxidized or reduced with the intercalation or deintercalation of the metal ions such as lithium ions.

As the negative electrode active material according to the embodiment, for example, a well-known material can be used, and examples of the well-known material include a metal that can easily form an alloy with a lithium, such as lithium, indium, tin, or silicon, a carbon material such as hard carbon or graphite, and an oxide active material such as $Li_4Ti_5O_{12}$ or $SiO_x$. In addition, as the negative electrode active material, a composite obtained by appropriately mixing the above-described negative electrode active materials may be used.

Regarding a ratio between the negative electrode active material and the solid electrolyte included in negative electrode mixture layer 332, when a value obtained by dividing the weight of the negative electrode active material by the weight of the solid electrolyte is set as a weight ratio, the weight ratio is preferably in a range of 1 to 19. The reason why the weight ratio is preferably in the above-described range is that both a lithium ion conduction path and an electron conduction path in negative electrode mixture layer 332 are likely to be secured.

C-1-2. Solid Electrolyte

As the solid electrolyte included in negative electrode mixture layer 332, the solid electrolyte described above in B-1-2. Solid Electrolyte may be used. Therefore, here, the description will not be repeated.

C-1-3. Binder

As the binder included in negative electrode mixture layer 332, the binder described above in B-1-3. Binder may be used. Therefore, here, the description will not be repeated.

C-1-4. Conductive Additive

As the conductive additive included in negative electrode mixture layer 332, the conductive additive described above in B-1-4. Conductive Additive may be used. Therefore, here, the description will not be repeated.

C-2. Negative Electrode Current Collector

As negative electrode current collector 331, for example, a foil-shaped body, a plate-shaped body, or a net-shaped body formed of SUS, gold, platinum, zinc, copper, nickel, titanium, tin, or an alloy of two or more kinds thereof can be used.

In addition, the thickness and the shape of negative electrode current collector 331 may be appropriately selected depending on the use of the all-solid-state battery.

D. Solid Electrolyte Layer

Solid electrolyte layer 321 according to the embodiment will be described using FIG. 3.

Solid electrolyte layer 321 according to the embodiment includes at least a solid electrolyte having lithium ion conductivity. Solid electrolyte layer 321 optionally further includes a binder in order to improve the adhesion strength between particles of the solid electrolyte.

D-1. Solid Electrolyte

As the solid electrolyte included in solid electrolyte layer 321, the solid electrolyte described above in B-1-2. Solid Electrolyte may be used. Therefore, here, the description will not be repeated.

D-2. Binder

As the binder included in solid electrolyte layer 321, the binder described above in B-1-3. Binder may be used. Therefore, here, the description will not be repeated.

E. Other Configuration

In all-solid-state battery 300 according to the embodiment, although not illustrated in the drawing, a terminal (metal positive electrode lead) may be welded and attached to a surface of positive electrode current collector 311 opposite to positive electrode mixture layer 312, or a terminal (metal negative electrode lead) may be welded and attached to a surface of negative electrode current collector 331 opposite to negative electrode mixture layer 332. The all-solid-state battery to which the terminal is attached, or an all-solid-state battery group obtained by connecting a plurality of all-solid-state batteries may be accommodated in a battery case. The all-solid-state battery or the all-solid-state battery group may be sealed in the battery case in a state where the positive electrode lead and the negative electrode lead are led out to the outside of the battery case.

Hereinafter, all-solid-state battery 300 according to the embodiment will be described.

F. Manufacturing Method

F-1. Method of Manufacturing All-Solid-State Battery

Next, a method of manufacturing the all-solid-state battery according to the embodiment will be described using FIGS. 4 and 5. FIG. 4 is a perspective view illustrating all-solid-state battery 400 according to the embodiment. FIG. 4 illustrates a state where solid electrolyte layer 321 and negative electrode mixture layer 430 are separated from each other to describe negative electrode mixture layer 430 in detail. A method of manufacturing all-solid-state battery 400 according to the embodiment includes a film forming step, a stacking step, and a pressing step. In the film forming step, positive electrode layer 310, negative electrode layer 440, and solid electrolyte layer 321 are prepared, respectively. In the stacking step, positive electrode layer 310, negative electrode layer 440, and solid electrolyte layer 321 are joined or stacked such that solid electrolyte layer 321 is disposed between positive electrode mixture layer 312 and negative electrode mixture layer 430. In the pressing step, the stacked structure obtained in the stacking step is pressed. Accordingly, FIG. 4 is a perspective view illustrating a state where the formation of positive electrode layer 310, negative electrode layer 440, and solid electrolyte layer 321 is completed, positive electrode layer 310 and solid electrolyte layer 321 are stacked, and solid electrolyte layer 321 is not yet disposed between positive electrode mixture layer 312 and negative electrode mixture layer 430.

F-2. Film Forming Step of Positive Electrode Layer

First, the film forming step of the positive electrode layer according to the embodiment will be described with reference to FIG. 4. The film forming step of positive electrode layer 310 according to the embodiment is a step of forming positive electrode layer 310 and can be performed using, for example, the following two methods.

(1) In the film forming step, positive electrode layer 310 according to the embodiment is prepared using, for example, a film forming step including an applying step, a drying and baking step, and a coating film pressing step. In the applying step, the positive electrode active material and the solid electrolyte are dispersed in an organic solvent, the binder and the conductive additive are optionally further dispersed in the organic solvent to prepare a slurry, and the obtained slurry is applied to a surface of positive electrode current collector 311. In the drying and baking step, the coating film obtained in the applying step is heated and dried to remove the organic solvent. As a result, a dry coating film is formed. In the coating film pressing step, the dry coating film formed on positive electrode current collector 311 is pressed.

A method of applying the slurry in the applying step is not particularly limited, and examples thereof include a well-known applying method using a blade coater, a gravure coater, a dip coater, a reverse coater, a roll knife coater, a wire bar coater, a slot die coater, an air knife coater, a curtain coater, an extrusion coater, or a combination thereof.

Examples of the organic solvent used for forming the slurry include heptane, xylene, and toluene. However, the organic solvent is not limited to these examples, and a solvent that does not cause a chemical reaction to occur with an active material may be appropriately selected.

The drying and baking step is not particularly limited as long as the organic solvent can be removed by drying the coating film, and a well-known drying method or baking method using a heater or the like may be adopted. The coating film pressing step is not particularly limited, and a well-known pressing step using a press machine or the like may be adopted.

(2) In addition, in the film forming step, positive electrode layer 310 according to the embodiment is prepared using a film forming step including a powder stacking step and a powder pressing step. In the powder stacking step, the solid electrolyte and the positive electrode active material as the positive electrode mixture in a powdered state (state where a slurry is not formed) are mixed with each other, the binder and the conductive additive are optionally further mixed with the positive electrode mixture, and the positive electrode mixture is uniformly stacked on positive electrode current collector 311. In the powder pressing step, a stacked body obtained in the powder stacking step is pressed.

F-3. Film Forming Step of Negative Electrode Layer

The film forming step of negative electrode layer 440 according to the embodiment is a step of forming negative electrode layer 440. In the film forming step, negative electrode layer 440 according to the embodiment is prepared in a basic film forming step using same method as described above in F-2. Film Forming Step of Positive Electrode Layer, except that the materials used are changed to the negative electrode mixture and negative electrode current collector 331 for negative electrode layer 440. The shape of the prepared negative electrode mixture layer 430 is different from that of positive electrode mixture layer 312, and thus will be described with reference to FIG. 4.

As illustrated in FIG. 4, here, the film forming method of negative electrode mixture layer 430 is different from a film forming method of the negative electrode mixture layer of the related art, in that negative electrode mixture layer 430 has a two-layer structure including first negative electrode mixture layer 432 and second negative electrode mixture layer 433 having a smaller area than the first negative electrode mixture layer in a plan view (on an X-Y plane).

That is, negative electrode mixture layer 430 has a step structure in which the thickness of negative electrode mixture layer 430 is not uniform and the thickness of a center portion is greater than that of a peripheral portion. In a plan view, second negative electrode mixture layer 433 has the same area and the same shape as positive electrode mixture layer 312. In addition, in the stacking step described below, in all-solid-state battery 400, second negative electrode mixture layer 433 is disposed at a position overlapping positive electrode mixture layer 312 in a plan view (on the stacking axis). That is, in a plan view (on the stacking axis), second negative electrode mixture layer 433 is disposed at a position overlapping positive electrode mixture layer 312 and has the same area as positive electrode mixture layer 312. The thickness of second negative electrode mixture layer 433 is preferably 5% or higher and 30% or lower the thickness of first negative electrode mixture layer 432. When the thickness of second negative electrode mixture layer 433 is higher than 30% the thickness of first negative electrode mixture layer 432, a gap between a portion of first negative electrode mixture layer 432 where second negative electrode mixture layer 433 is not stacked and positive electrode layer 310 is likely to increase, and the capacity per volume of the all-solid-state battery is likely to decrease. In other words, by adjusting the thickness of second negative electrode mixture layer 433 to be 30% or lower the thickness of the first negative electrode mixture layer, a gap between the portion of first negative electrode mixture layer 432 where second negative electrode mixture layer 433 is not stacked and positive electrode layer 310 can be prevented from increasing, and the capacity per unit volume of the all-solid-state battery can increase.

In a plan view (on the stacking axis), the area of second negative electrode mixture layer 433 may be greater than the area of positive electrode mixture layer 312. In addition, in a plan view (on the stacking axis), the area of second negative electrode mixture layer 433 may be greater than the area of positive electrode mixture layer 312, positive electrode mixture layer 312 may be stacked to be positioned inside of second negative electrode mixture layer 433 in the stacking step described below.

Second negative electrode mixture layer 433 may be formed using a method including: applying the slurry of the negative electrode mixture to negative electrode current collector 331; drying the applied negative electrode mixture to prepare first negative electrode mixture layer 432; applying the slurry of the negative electrode mixture again; and drying the applied negative electrode mixture, or may be formed using a method including stacking the negative electrode mixture in a powdered state (state where a slurry is not formed) on first negative electrode mixture layer 432.

When negative electrode mixture layer 430 is formed using the method including stacking the negative electrode mixture in the powdered state, the drying step is unnecessary, there is an advantageous effect in that the manufacturing costs are low, and the solvent not contributing to the capacity of the battery is not likely to remain in the formed negative electrode mixture layer 430. For example, the solvent concentration in negative electrode mixture layer 430 is 10 ppm or lower. Even when positive electrode mixture layer 312 is formed using the method including stacking the positive electrode mixture in a powdered state, the same method of forming negative electrode mixture layer 430 can be used.

F-4. Film Forming Step of Solid Electrolyte Layer

The film forming step of solid electrolyte layer 321 according to the embodiment is a step of forming solid electrolyte layer 321. Solid electrolyte layer 321 according to the embodiment is prepared using the same method as that of the film forming step in "F-2. Film Forming Step of Positive Electrode Layer, except that, for example, the solid electrolyte is dispersed in an organic solvent, the binder is further dispersed in the organic solvent to prepare a slurry, and the obtained slurry is applied to a substrate and that a step of removing the substrate is provided after the pressing step.

The organic solvent used for preparing the slurry is not particularly limited as long as it does not adversely affect the performance of the solid electrolyte. Examples of the organic solvent include a hydrocarbon organic solvent such as heptane, toluene, or hexane. Among these, a hydrocarbon organic solvent in which the water content is reduced by dehydration is preferable.

The substrate is not particularly limited as long as solid electrolyte layer 321 can be formed on the substrate, a film-shaped flexible or hard substrate is used, and examples thereof include a polyethylene terephthalate (PET) film.

F-5. Stacking Step and Pressing Step

In the stacking step according to the embodiment, positive electrode layer 310, negative electrode layer 440, and solid electrolyte layer 321 obtained in the film forming step are stacked such that solid electrolyte layer 321 is disposed between positive electrode mixture layer 312 and negative electrode mixture layer 430. As a result, a stacked structure is obtained.

In the pressing step according to the embodiment, the stacked structure obtained in the stacking step is pressed from the outside of positive electrode current collector 311 and negative electrode current collector 331 in the stacking direction to obtain all-solid-state battery 400.

An object of the pressing step is to increase the densities of positive electrode mixture layer 312, negative electrode mixture layer 430, and solid electrolyte layer 321. By increasing the densities, the lithium ion conductivity and the electron conductivity in positive electrode mixture layer 312, negative electrode mixture layer 430, and solid electrolyte layer 321 can be improved, and the all-solid-state battery having excellent battery characteristics can be obtained.

In addition, in the pressing step, changes in the shape and the density of negative electrode mixture layer 430 caused by a pressing pressure will be described using FIG. 5. FIG. 5 is cross-sectional views illustrating all-solid-state batteries 500 to 503 before and after the pressing step. (a) of FIG. 5 is a cross-sectional view illustrating all-solid-state battery 500 before the pressing step and is a cross-sectional view illustrating all-solid-state battery 500 including negative electrode mixture layer 430 having a step structure in which the thickness of center portion 450 is greater than that of a peripheral portion as in all-solid-state battery 400 of FIG. 4. In all-solid-state battery 500 before the pressing step, positive electrode current collector 311, positive electrode mixture layer 312, solid electrolyte layer 321, negative electrode mixture layer 430, and negative electrode current collector 331 are stacked in this order from the top. Negative electrode mixture layer 430 on solid electrolyte layer 321 side has a step structure in which the thickness of center portion 450 is greater than that of the peripheral portion. Center portion 450 of negative electrode mixture layer 430 is in contact with solid electrolyte layer 321. In all-solid-state battery 500, the area of a portion of negative electrode mixture layer 430 in contact with solid electrolyte layer 321 is the same as that of a portion of positive electrode mixture layer 312 in contact with solid electrolyte layer 321. The area of the portion of negative electrode mixture layer 430 in contact with solid electrolyte layer 321 may be greater than that of the portion of positive electrode mixture layer 312 in contact with solid electrolyte layer 321. That is, on the stacking axis (in a plan view), the area of a portion of negative electrode mixture layer 430 in contact with solid electrolyte layer 321 may be greater than or equal to that of a portion of positive electrode mixture layer 312 in contact with solid electrolyte layer 321. In addition, in a plan view (on the stacking axis), the portion of negative electrode mixture layer 430 in contact with solid electrolyte layer 321 is disposed at a position overlapping the portion of positive electrode mixture layer 312 in contact with solid electrolyte layer 321. (b) to (d) of FIG. 5 are cross-sectional views illustrating all-solid-state batteries 501 to 503 after the pressing step obtained by pressing all-solid-state battery 500 at a low pressure, an intermediate pressure, and a high pressure, respectively.

In a plan view (on the stacking axis), the area of the portion of negative electrode mixture layer 430 in contact with solid electrolyte layer 321 may be greater than that of the portion of positive electrode mixture layer 312 in contact with solid electrolyte layer 321. In addition, the portion of negative electrode mixture layer 430 in contact with solid electrolyte layer 321 may be positioned inside of the portion of positive electrode mixture layer 312 in contact with solid electrolyte layer 321.

When all-solid-state battery 500 before the pressing step illustrated in (a) of FIG. 5 is pressed at a low pressure, as illustrated in (b) of FIG. 5, in all-solid-state battery 501 after the pressing step, the thickness of negative electrode mixture layer 430 before the pressing step is the same as that of negative electrode mixture layer 430a after the pressing step. Therefore, the density of negative electrode mixture layer 430 before the pressing step is the same as that of negative electrode mixture layer 430a after the pressing step. In addition, in a plan view (on the stacking axis), positive electrode mixture layer 312 is disposed at a position overlapping center portion 450a of negative electrode mixture layer 430a having a greater thickness than the peripheral portion. Accordingly, in all-solid-state battery 501 after the pressing step, in a plan view (on the stacking axis), the thickness of a first portion of negative electrode mixture layer 430a overlapping positive electrode mixture layer 312a is greater than that of a second portion of negative electrode mixture layer 430a not overlapping positive electrode mixture layer 312a. At this time, for example, when negative electrode mixture layer 430 illustrated in FIG. 4 in which the thickness of second negative electrode mixture layer 433 is 5% or higher and 30% or lower the thickness of first negative electrode mixture layer 432 is used, in a plan view (on the stacking axis), the thickness of the first portion of negative electrode mixture layer 430a overlapping positive electrode mixture layer 312a is greater than the thickness of the second portion of negative electrode mixture layer 430a not overlapping positive electrode mixture layer 312a by 5% or higher and 30% or lower.

When the all-solid-state battery is pressed at a low pressure, the pressing pressure may be appropriately adjusted depending on the material to be used and the like and is, for example, 100 MPa or higher and 400 MPa or lower.

In addition, when all-solid-state battery 500 before the pressing step illustrated in (a) of FIG. 5 is pressed at an intermediate pressure, as illustrated in (c) of FIG. 5, in all-solid-state battery 502 after the pressing step, negative electrode mixture layer 430 before the pressing step is pressed such that the thickness of center portion 450b of negative electrode mixture layer 430b after pressing step is less than the thickness of center portion 450 of negative electrode mixture layer 430 before pressing. However, a surface of negative electrode mixture layer 430b facing solid electrolyte layer 321b is not flat (the thickness of center portion 450b of negative electrode mixture layer 430b is greater than that of the peripheral portion of negative electrode mixture layer 430b). In addition, in a plan view (on the stacking axis), positive electrode mixture layer 312 is disposed at a position overlapping center portion 450b of negative electrode mixture layer 430b having a greater thickness than the peripheral portion. Accordingly, in all-solid-state battery 502 after the pressing step, in a plan view (on the stacking axis), the thickness of a first portion of negative electrode mixture layer 430b overlapping positive electrode mixture layer 312b is greater than that of a second portion of negative electrode mixture layer 430b not overlapping positive electrode mixture layer 312b. In addition, in all-solid-state battery 502 after the pressing step, in a plan view (on the stacking axis), the density of the first portion of negative electrode mixture layer 430b overlapping positive electrode mixture layer 312b is higher than that of the second portion of negative electrode mixture layer 430b not overlapping positive electrode mixture layer 312b. At this time, for example, when negative electrode mixture layer 430 illustrated in FIG. 4 in which the thickness of second negative electrode mixture layer 433 is 5% or higher and 30% or lower the thickness of first negative electrode mixture layer 432 is used, in a plan view (on the stacking axis), a maximum difference between the thickness of the first portion of negative electrode mixture layer 430b overlapping positive electrode mixture layer 312b and the thickness of the second portion of negative electrode mixture layer 430b not overlapping positive electrode mixture layer 312b is 30% or lower a minimum thickness of the second portion of negative electrode mixture layer 430b not overlapping positive electrode mixture layer 312b. In addition, in all-solid-state battery 502 after the pressing step, in a plan view (on the stacking axis), a difference between the density of the first portion of negative electrode mixture layer 430b overlapping positive electrode mixture layer 312b and the density of the second portion of negative electrode mixture layer 430b not overlapping positive electrode mixture layer 312b is 30% or lower the density of the second portion of negative electrode mixture layer 430b not overlapping positive electrode mixture layer 312b.

When the all-solid-state battery is pressed at an intermediate pressure, the pressing pressure may be appropriately adjusted depending on the material to be used and the like and is, for example, 400 MPa or higher and 800 MPa or lower.

In addition, when all-solid-state battery 500 before the pressing step illustrated in (a) of FIG. 5 is pressed at a high pressure, as illustrated in (d) of FIG. 5, in all-solid-state battery 503 after the pressing step, negative electrode mixture layer 430 before the pressing step is pressed such that a surface of negative electrode mixture layer 430c facing solid electrolyte layer 321c is flat. That is, in a plan view (on the stacking axis), the density of center portion 450 (refer to (a) of FIG. 5) of negative electrode mixture layer 430 having a greater thickness than the peripheral portion increases, and a region having a high density in negative electrode mixture layer 430c after pressing is formed in center portion 450c. In addition, in a plan view (on the stacking axis), positive electrode mixture layer 312 is disposed at a position overlapping the region having a high density in negative electrode mixture layer 430c. In addition, in all-solid-state battery 503 after the pressing step, in a plan view (on the stacking axis), the density of the first portion of negative electrode mixture layer 430c overlapping positive electrode mixture layer 312c is higher than that of the second portion of negative electrode mixture layer 430c not overlapping positive electrode mixture layer 312c. At this time, for example, when negative electrode mixture layer 430 illustrated in FIG. 4 in which the thickness of second negative electrode mixture layer 433 is 5% or higher and 30% or lower the thickness of first negative electrode mixture layer 432 is used, in a plan view (on the stacking axis), the density of the first portion of negative electrode mixture layer 430c overlapping positive electrode mixture layer 312c is higher than the density of the second portion of negative electrode mixture layer 430c not overlapping positive electrode mixture layer 312c by 5% or higher and 30% or lower.

When the all-solid-state battery is pressed at a high pressure, the pressing pressure may be appropriately adjusted depending on the material to be used and the like and is, for example, 800 MPa or higher and 1500 MPa or lower.

As described above in F-3. Film Forming Step of Negative Electrode Layer, the thickness of second negative electrode mixture layer 433 in FIG. 4 is preferably 5% or higher and lower than 30% the thickness of first negative electrode mixture layer 432. By adjusting the thickness of second negative electrode mixture layer 433 to be 5% or higher the thickness of first negative electrode mixture layer 432, even when the shape of negative electrode mixture layer 430 is changed by the pressing pressure in the pressing step, in a plan view (on the stacking axis), an approach between positive electrode mixture layer 312 and negative electrode mixture layer 430 caused by deformation of the first portion of negative electrode mixture layer 430 overlapping positive electrode mixture layer 312 can be relaxed.

As described above, in all-solid-state batteries 501 to 503 pressed at a low pressure, an intermediate pressure, and a high pressure, in a plan view from the stacking direction (on the stacking axis), the weight per unit area of the first portion of negative electrode mixture layers 430a to 430c overlapping positive electrode mixture layers 312a to 312c is greater than the weight per unit area of the second portion of negative electrode mixture layers 430a to 430c not overlapping positive electrode mixture layers 312a to 312c. At this time, for example, when negative electrode mixture layer 430 illustrated in FIG. 4 in which the thickness of second negative electrode mixture layer 433 is 5% or higher and 30% or lower the thickness of first negative electrode mixture layer 432 is used, in respective all-solid-state batteries 501 to 503, in a plan view (on the stacking axis), the weight per unit area of the first portion of negative electrode mixture layers 430a to 430c overlapping positive electrode mixture layers 312a to 312c is greater than the weight per unit area of the second portion of negative electrode mixture layers 430a to 430c not overlapping positive electrode mixture layers 312a to 312c by 5% or higher and 30% or lower.

Hereinafter, the all-solid-state battery according to the present disclosure has been described based on the embodiment. However, the present disclosure is not limited to the embodiment. Within a range not departing from the scope of the present disclosure, various modifications conceived by those skilled in the art applied to the embodiment or another embodiment constructed by a combination of some components in the embodiment are included in the range of the present disclosure.

In addition, for example, in the all-solid-state battery according to the embodiment, the solid electrolyte layer is disposed only between the positive electrode mixture layer and the negative electrode mixture layer. The solid electrolyte layer may also be disposed in a direction (on an X-Z plane or a Y-Z plane) perpendicular to the stacking direction of the positive electrode mixture layer and the negative electrode mixture layer.

In addition, for example, the all-solid-state battery according to the embodiment may include a sealing member that is formed of an insulating material in a direction perpendicular to the stacking direction of the positive electrode mixture layer, the solid electrolyte layer, and the negative electrode mixture layer.

In addition, for example, in the all-solid-state battery according to the embodiment, in a plan view (on the stacking axis), the positive electrode mixture layer has the same area as the region of the negative electrode mixture layer in which the weight per unit area is greater than that of the other region. However, the positive electrode mixture layer may have a smaller area than the region of the negative electrode mixture layer in which the weight per unit area is greater than that of the other region, and may be positioned inside of the region of the negative electrode mixture layer in which the weight per unit area is greater than that of the other region.

The all-solid-state battery according to the present disclosure is expected to be applicable to power supplies such as a portable electronic apparatus or various batteries such as an on-vehicle battery.

What is claimed is:

1. An all-solid-state battery comprising:
   a positive electrode layer including a positive electrode current collector and a positive electrode mixture layer, the positive electrode mixture layer being stacked on the positive electrode current collector and including a positive electrode active material and a solid electrolyte;
   a negative electrode layer including a negative electrode current collector and a negative electrode mixture layer, the negative electrode mixture layer being stacked on the negative electrode current collector and including a negative electrode active material and a solid electrolyte; and
   a solid electrolyte layer that is disposed between the positive electrode mixture layer and the negative electrode mixture layer and includes a solid electrolyte having ion conductivity,
   wherein the negative electrode mixture layer has a pre-manufacturing-pressing shape including a step structure with a first portion of different thickness greater than a second portion, and an after-manufacturing-pressing shape in which the thickness of the first portion is reduced by pressing, such that a weight per unit area of the first portion of the negative electrode mixture layer, which overlaps the positive electrode mixture layer on a stacking axis, is greater than a weight per unit area of the second portion of the negative electrode mixture layer, which does not overlap the positive electrode mixture layer on the stacking axis.

2. The all-solid-state battery of claim 1, wherein a maximum difference between the thickness of the first portion and the thickness of the second portion is 30% or lower of a minimum thickness of the second portion.

3. The all-solid-state battery of claim 1,
   wherein a density of the first portion is higher than a density of the second portion.

4. The all-solid-state battery of claim 3,
   wherein a difference between the density of the first portion and the density of the second portion is 30% or lower of the density of the second portion.

5. The all-solid-state battery of claim 1,
   wherein the weight per unit area of the first portion is greater than the weight per unit area of the second portion by 5% or higher and 30% or lower.

6. The all-solid-state battery of claim 1,
   wherein at least one of the positive electrode mixture layer and the negative electrode mixture layer includes a binder.

7. The all-solid-state battery of claim 1,
   wherein at least one of the positive electrode mixture layer and the negative electrode mixture layer includes a conductive additive.

8. The all-solid-state battery of claim 1,
   wherein a concentration of a solvent in at least one of the positive electrode mixture layer and the negative electrode mixture layer is 10 ppm or lower.

* * * * *